Figure 1:
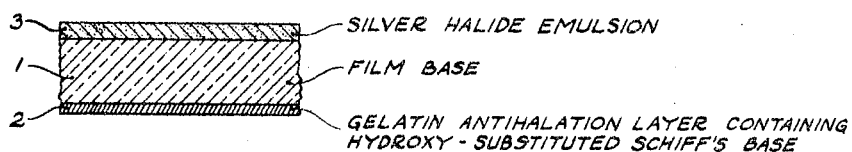

Nov. 23, 1954     V. TULAGIN     2,695,233
IRREVERSIBLY DISCHARGEABLE PHOTOGRAPHIC FILTER LAYERS
AND METHOD OF PROCESSING FILM CONTAINING THE SAME
Filed Dec. 9, 1950

INVENTOR
VSEVOLOD TULAGIN
BY
ATTORNEYS

2,695,233

IRREVERSIBLY DISCHARGEABLE PHOTOGRAPHIC FILTER LAYERS AND METHOD OF PROCESSING FILM CONTAINING THE SAME

Vsevolod Tulagin, Phillipsburg, N. J., assignor to General Aniline & Film Corporation, New York, N. Y., a corporation of Delaware Application December 9, 1950, Serial No. 200,095

7 Claims. (Cl. 95—2)

The present invention relates to irreversibly dischargeable photographic filter and antihalation layers containing as the active filtering agent, a yellow non-diffusing Schiff's base, and to a method of processing photographic material containing the same.

Multi-layer color film, as commercially exploited at the present time, is constructed in the form of an integral tri-pack comprising a base and three superimposed silver halide emulsion layers thereon, sensitized, respectively, in the order of their arrangement on the base to red, green and blue light.

It is known that all high-speed photographic emulsions are highly sensitive to blue light. Consequently, in the present-day color material, there is always present between the blue and green sensitive layers, a filter layer. This filter layer contains a yellow colorant which absorbs blue light, thus preventing it from reaching and exposing the green and red sensitive layers.

The yellow colorant, in order to be effective in the intended relationship, must possess certain prerequisites. Thus, it must be capable of being completely removed during the processing of the film. Unless it be so removed, the whole material would be colored yellow and the formation of white or transparent areas would be impossible.

The colorant must also be non-migratory in the colloid employed as the carrier therefor. If the colorant should migrate from the filter layer, to adjacent silver halide emulsion layers, it would seriously interfere with the spectral sensitivities thereof. Color degradation would inevitably ensue.

The colorant must be a "brilliant" one; that is to say, the colorant should absorb a large percentage of the blue light and yet be almost completely transparent to the green and red regions of the spectrum. It is manifest that unless the colorant is capable of this operation, its purpose cannot be completely attained.

Finally, the colorant must be either water soluble or dispersible in an aqueous solution of the colloid serving as a carrier therefor. Patently, without this property, the difficulties of manufacturing the filter layer would over-balance any other desirable properties possessed by the colorant.

United States Letters Patent 2,500,111 discloses azanol dyes which are stated to be useful for the preparation of filter and antihalation layers. These dyes are prepared by the reaction of a hydrazine, or an aliphatic or aromatic diamine, with a 5 or 6-membered heterocyclic nitrogenous intermediate, having a reactive acetanilid group linked to a carbon atom of a methenyl chain.

Among the dyes mentioned by the patentee are those derived from 1-phenyl-3-methyl-5-pyrazolone and p-phenylenediamine, 3-allylrhodanine and p-phenylenediamine and the like. It has been found that while these products possess many of the characteristics of an excellent filter dye, they suffer from the disadvantage that they are migratory in the water soluble colloidal material serving as a base for the filter layer. Thus, it is evident that the provision of a satisfactory yellow colorant for filter or antihalation layers is not the simple problem that it might, at first blush, appear to be.

I have now discovered that "minus blue" colorants, having all of the necessary prerequisites, are those which are obtained by the condensation of ortho hydroxy aldehydes with primary aliphatic or aromatic amines, either the aldehyde or the amine being provided with a group which renders the condensation product non-migratory in colloidal materials.

Filter layers (it being understood that this term includes anti-halation layers) containing such yellow colorants, and a method of processing photographic materials containing such filter or antihalation layers to effect the discharge of the colorants irreversibly, constitute the purposes and objects of the present invention.

The yellow colorants, the utilization of which is contemplated herein, may be characterized by the following structural formulae:

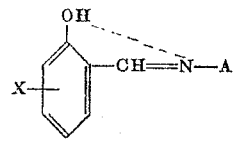

and

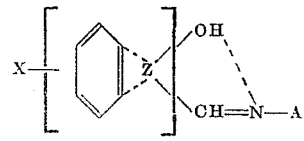

in which X is hydrogen, alkyl such as methyl, ethyl, propyl, butyl or the like, hydroxyalkyl such as hydroxymethyl, hydroxyethyl or the like, aryl such as phenyl, toluyl or the like, nitro, hydroxy, sulfo, carboxy, acylamino such as acetylamino, butrylamino, lauroylamino, stearoylamino or the like, amino, alkylamino such as methylamino, ethylamino, butylamino, decylamino, dodecylamino, octadecylamino, dimethylamino, diethylamino, dibutylamino or the like, cyano and acyloxyalkyl such as carboxymethyl or the like, Z represents the atoms necessary to complete a 6-membered aromatic or heterocyclic ring containing a conjugated, unsaturated system such as benzo, pyrido and the like and A is aliphatic such as methyl, ethyl, butyl, cetyl, decyl, dodecyl, octadecyl, or the like, or aromatic such as phenyl, toluyl, dimethylphenyl, sulfophenyl, tetradecoxyphenyl, dodecoxyphenyl, p - sulfododecoxyphenyl, lauroylaminophenyl, p - sulfooctadecylsulfonamidophenyl, m - sulfostearoylaminotoluyl, p-sulfooctadecylaminophenyl, (1'-octadecyl-5'-sulfo-benzimidazolyl)-phenyl, and the like.

It is evident that certain of the above substituent groups, such as hydroxyamino or substituted amino, are auxochromes. By the utilization of such substituents, the color of the yellow dyes may be varied. This is important since it enables the production of yellow filter dyes with a wide range of different spectral adsorptions.

A number of the substituents mentioned are also negative in character, and in this group may be mentioned the nitro, sulfo, carboxy and cyano groups. Such groups have the ability to stabilize the dyestuffs to oxidation and hydrolysis.

It has been stated that the ease of dissolving or dispersing the colorants in aqueous colloidal solutions is a desirable feature of the yellow filter dyes. This property is often attributable to the utilization, as substituents, of groups mentioned above, having a water solubilizing function such as the sulfo, carboxy, hydroxy and hydroxyalkyl groups.

In the above compounds, the hydroxyl group is always in ortho position to the azomethine linkage. It has been found that the oxygen of this hydroxyl group is enolic in character since the hydrogen bound thereto is labile. This has been indicated in the above formulae by the dotted lines running from the hydroxyl group to the nitrogen atom of the azomethine linkage.

Examples of compounds embraced by the above formulae which I have found answer the above prerequisites are the following.

(1) 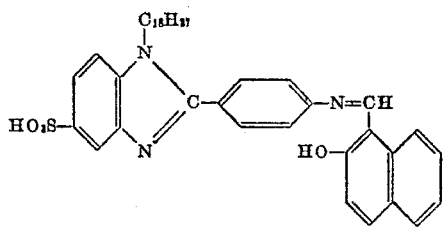

(2) 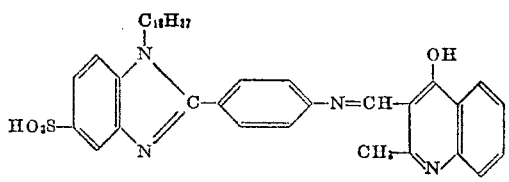

(3) 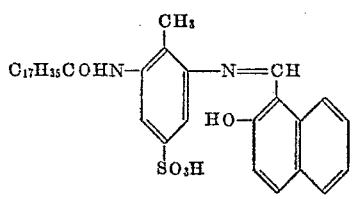

(4) 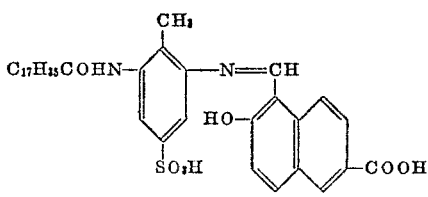

(5) 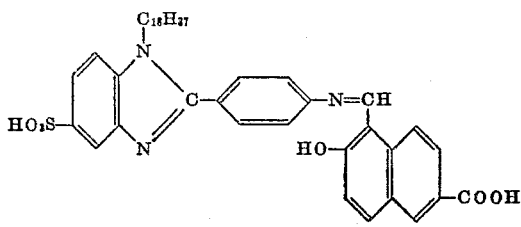

(6) 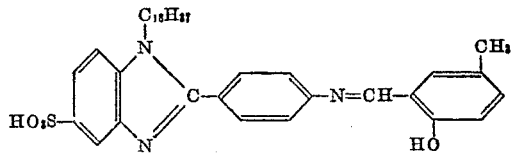

(7) 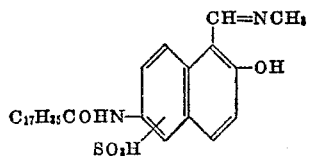

(8) 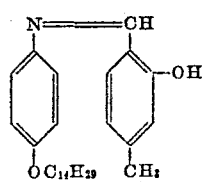

(9) 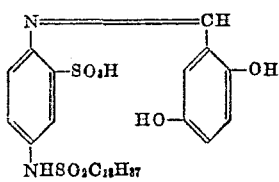

(10) 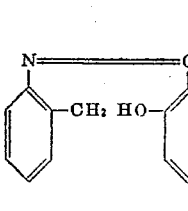

(11) 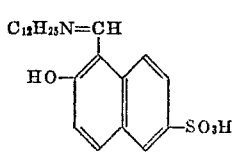

(12) 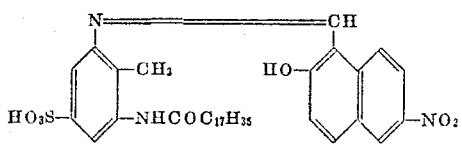

(13) 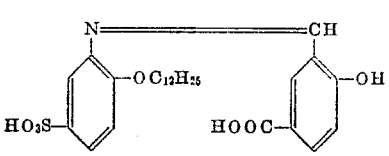

(14) 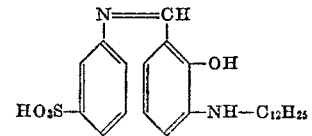

The above compounds are prepared by heating an ortho hydroxy aldehyde with a primary aliphatic or aromatic amine. Either the amine or the aldehyde must contain a radical which renders the dyestuff molecule non-diffusing in a colloidal medium. This end is preferably achieved by incorporating in either the aldehyde or the primary amine, an alkyl chain of at least 10 carbon atoms.

The aldehydes which are employed have the following structural formulae:

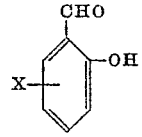

and

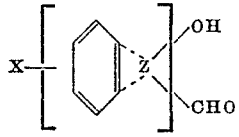

in which X and Z have the values given above, and the hydroxyl group is always in ortho position to the aldehydic group.

Examples of aldehydes which I have found to be eminently suitable for the production of the Schiff's bases are I. Salicylaldehyde
II. 3-methyl-6-hydroxy-benzaldehyde
III. 3-ethyl-6-hydroxy-benzaldehyde
IV. 2-methyl-6-hydroxy-benzaldehyde
V. 2,4-dimethyl-6-hydroxy-benzaldehyde
VI. 2-isopropyl-5-methyl-6-hydroxy-benzaldehyde
VII. 2-hydroxy-3-methyl-5-hydroxymethyl-benzaldehyde
VIII. 3-hydroxymethyl-6-hydroxy-benzaldehyde
IX. 4,6-dihydroxy-benzaldehyde
X. 2-methyl-4,6-dihydroxy-benzaldehyde
XI. 3-methyl-5,6-dihydroxy-benzaldehyde
XII. 3-methyl-4,6-dihydroxy-benzaldehyde
XIII. 2-hydroxy-3-nitro-benzaldehyde XIV. 2-hydroxy-5-nitro-benzaldehyde
XV. 2-hydroxy-3-amino-benzaldehyde
XVI. 2-hydroxy-4-dimethylamino-benzaldehyde
XVII. 2-hydroxy-4-dodecylamino-benzaldehyde
XVIII. 2-hydroxy-3-stearolyamino-benzaldehyde
XVIX. 2-hydroxy-3-laurolylamino-benzaldehyde
XX. 2-hydroxy-3-propionylamino-benzaldehyde
XXI. 2-hydroxy-benzaldehyde-5-sulfonic acid
XXII. 4-hydroxy-3-formyl-benzoic acid
XXIII. 3-hydroxy-4-formyl-benzoic acid (Chem. Abst. 36, P 27318)
XXIV. 2-hydroxy-3-cyano-benzaldehyde
XXV. 3-hydroxymethyl-5-methyl-2-hydroxy benzaldehyde (Berichte 63B, 551–9 [1930])
XXVI. 2-hydroxy-5-phenyl-benzaldehyde (Chem. Soc. [1926], 3047)
XXVII. 2-hydroxy-naphthaldehyde
XXVIII. 2-hydroxy-naphthaldehyde-6-sulfonic acid
XXIX. 1-hydroxy-2-naphthaldehyde-4-sulfonic acid
XXX. 2-hydroxy-6-nitro-naphthaldehyde
XXXI. 2-hydroxy-6-stearoylamino-naphthaldehyde
XXXII. 2-hydroxy-6-stearoylamino-naphthaldehyde-4-sulfonic acid
XXXIII. 2-hydroxy-naphthaldehyde-6-carboxylic acid
XXXIV. 2-hydroxy-6-amino-naphthaldehyde
XXXV. 2-hydroxy-4-octadecylamino-naphthaldehyde
XXXVI. 2-formyl-3-hydroxyquinoline of the following structure:

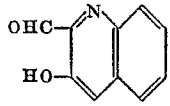

XXXVII. 3-formyl-4-hydroxyquinaldine of the following structure:

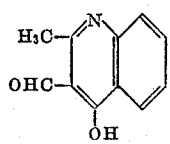

XXXVIII. 3-acetoxymethyl-5-methyl-2-hydroxybenzaldehyde

The amines which are employed may be aliphatic or aromatic mono-primary amines. Examples of aliphatic amines are methyl amine, ethyl amine, butyl amine, cetyl amine, decyl amine, dodecyl amine, octadecyl amine, or the like.

Examples of aromatic amines are aniline, o-, m-, or p-toluidine, o-, m-, or p-xylidine, the mono-primary amines disclosed in copending application Serial No. 43,756 filed by Joseph A. Sprung on August 11, 1948, now Patent No. 2,629,658, entitled "Silver Halide Emulsions Containing Non-Diffusing Azo Dyes" such as 2-tetrodecoxy-aniline
4-dodecoxy-aniline
4-tetradecoxy-aniline
2-dodecoxy-aniline-5-sulfonic acid
2-octadecoxy-aniline-5-sulfonic acid
4-amino-lauranilide
5-octadecane-sulfonamido-orthanilic acid
4-methyl-5-stearamido-metanilic acid, and the like,
4-methylamino-6-stearoylamino-metanilic acid of the formula

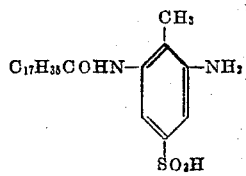

4-octadecylamino-metanilic acid 2-(4'-aminophenyl)-1 - octadecyl - benzimidazole - 5 - sulfonic acid, of the formula

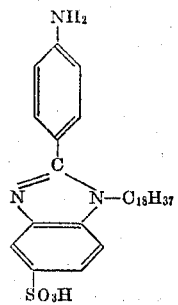

Practically all of the aldehydes previously referred to are described in the literature. Those which are not so described may be made by relatively simple procedures. Thus, 2-hydroxy-6-stearoylamino-naphthaldehyde is prepared by reducing 2-hydroxy-6-nitro-naphthaldehyde with an alkyline hydrosulfite solution, followed by a treatment of the cooled reduction mixture with stearoylchloride. The sulfonic acid derivative of this aldehyde is obtained by sulfonating the same with concentrated sulfuric acid at 50 to 60° C. for several hours.

1-formyl-2-hydroxynaphthalene-6-carboxylic acid is made by the application of the Reimer-Tiemann reaction to 6-hydroxy-2-naphthoic acid. For a definition of the Reimer-Tiemann reaction, reference is made to page 190 of Organic Chemistry by Gilman, vol. 1, Second Edition.

2-hydroxy-3-cyano-benzaldehyde is prepared by diazotizing 2-hydroxy-3-amino-benzaldehyde and reacting the resulting diazonium compound with cuprous cyanide according to the Sandmeyer reaction.

3-acetoxymethyl-5-methyl - 2 - hydroxybenzaldehyde is prepared by refluxing 3-chloromethyl-5-methyl-2-hydroxybenzaldehyde (Berichte 63B, 55–19) with sodium acetate in ethyl alcohol.

The last three amines mentioned above, and having long aliphatic chains, are described in Fiat Final Report #943.

The above colorants may be solubilized for dispersion in a colloidal carrier by various methods. Thus the dyes may be suspended in absolute alcohol and enough alkali, such as sodium hydroxide, added to obtain a neutral solution. Water is then added until a uniform solution ensues. Conversely, the dye may be suspended in alcohol, and a base, such as morpholine, is cautiously added until the dye is brought into solution. Water is then incorporated, and the mixture stirred until it is homogeneous.

Solutions of the dye, produced as above, are incorporated into an aqueous colloidal carrier such as gelatin, polyvinyl alcohol, the copolymer of maleic anhydride and methylvinyl ether by adding to a solution of the dyestuff, slowly and with agitation, a 10% aqueous solution of the colloid selected. If a base such as morpholine has been employed for solubilization of the dyestuff, the solution of the colloid is adjusted to a pH of 7 to 8 by the addition of sodium hydroxide prior to mixing it with the dye solution. The mixture attained in this way is stored until homogeneous and then used in the coating of photographic film.

It has been ascertained, and this constitutes a very important feature of my invention, that filter or antihalation layers containing the colorants of the present invention may be completely and irreversibly discharged by the use of a bath containing a base such as hydrazine, hydroxylamine or a semi-carbazide such as semi-carbizide itself or those described in United States Letters Patent 2,495,000 granted January 17, 1950, or the salts of such bases, such as the hydrochloride, sulfate, phosphate, formate, nitrate and the like, i. e. hydroxylamine, hydrochloride, hydroxylamine sulfate, hydrazine hydrochloride, hydrazine formate, hydrazine nitrate, hydrazine sulfate and the salts of the semi-carbazides described in the aforementioned USP 2,495,000. While these solutions operate on the alkaline side, and indeed at almost any pH, best results ensue when the solutions are buffered to the acid side, i. e. within a range of pH 6 to 2. In using the solutions, it is recommended that they be employed at a temperature ranging from about 65 to 70° F.

In the event that the filter layer appears in multilayer color film, then the discharging bath may be substituted for one of the acid short-stop baths used in color film processing. When employed in this way, the solutions do not add any extra step or complicate the usual processing. It is, of course, evident that the solutions may be employed as independent processing baths, either in the working up of color film or of black and white film when the colorants hereof are used as antihalation or filter layers in such black and white film.

The following examples serve to illustrate the invention, but it is to be understood that the invention is not restricted thereto. The parts are by weight, unless otherwise stated.

SECTION I

Preparation of dyes

EXAMPLE 1

Into a 500 cc. flask equipped with a short fractionating column and an agitator, are placed 40.5 g. (.075 mole) of the amine, 2-(4'-aminophenyl)-1-octadecylbenzimidazole-5-sulfonic acid, 250 cc. of glacial acetic acid and 50 cc. of pyridine. 2-hydroxy-1-naphthaldehyde (26 g.=.15 mole) was added and the mixture was slowly refluxed under the column. The water was thus distilled out as it formed. After 4 hours 30 cc. of distillate had been obtained and the mixture was deeply colored. The hot solution was filtered and the filtrate was cooled. The crystalline material was collected by filtration, washed with alcohol and crystallized from dimethyl formamide. The solid was collected by filtration, thoroughly washed with absolute alcohol and ether and dried . The product consisted of brilliant orange yellow crystals. A yield of 30 g. was obtained.

The product corresponds to compound 1 above.

EXAMPLE 2

Into a 500 cc. flask equipped with a short fractionating column and an agitator are placed 24 g. of the amine of Example 1, 150 cc. of glacial acetic acid, 30 cc. of pyridine and 8.3 g. of 3-formyl-4-hydroxy-quinaldine. The mixture is refluxed with slow distillation for 3½ hours and then under total reflux for 20 hours. A small amount of an insoluble impurity was removed by filtration of the hot solution and the filtrate was cooled. The precipitated, white crystalline material was removed by filtration and the filtrate was diluted with a large volume of acetone. The yellow filter dye which precipitated was collected by filtration, washed with acetone and dried. It was suitable for use without further purification.

The product corresponds to compound 2 above.

EXAMPLE 3

Into a 1000 cc. round bottomed flask equipped with a reflux condenser are placed, 47 g. of 4-methylamino-6-stearoylamino-metanilic acid, 17.5 g. of 2-hydroxy-1-naphthaldehyde, 470 cc. of glacial acetic acid and 60 g. of anhydrous sodium acetate and the mixture is refluxed with a slow distillation of acetic acid for 4 hours. The resulting dark solution is cooled and the precipitated crystalline yellow dye is collected by filtration. The solid so obtained is thoroughly extracted with acetone and dried. The material is suitable for use without further purification.

The product corresponds to compound 3 above.

EXAMPLE 4

The procedure is the same as in Example 3, excepting that the aldehyde used is 2-hydroxy-1-naphthaldehyde-6-carboxylic acid.

The product corresponds to compound 4 above.

EXAMPLE 5

The procedure is the same as in Example 3, while utilizing as the amine that of Example 1, and while utilizing as the aldehyde that of Example 4.

The product corresponds to compound 5 above.

EXAMPLE 6

The procedure is the same as in Example 3 but while using 2-hydroxy-5-methylbenzaldehyde as the aldehyde.

The product corresponds to compound 6 above.

EXAMPLE 7

Into a 250 cc. round bottomed flask are placed 3 grams of 2 - hydroxy - 6 - stearoylamino - naphthaldehyde - x-sulfonic acid, 100 cc. of glacial acetic acid and 1 cc. of 30% methyl amine solution. The mixture is slowly distilled, through a simple fractionating column for 4 hours. The residual liquid is evaporated on a steam-cone at 22 mm. pressure. The residue is thoroughly extracted with a little acetone. The insoluble yellow dye is collected by filtration, washed with acetone, dried and used without further purification.

The product corresponds to that of compound 7 above.

SECTION II

Preparation of dye solutions and filter layers

EXAMPLE 8

600 mg. of the dye of Example 1 were suspended in 6 cc. of absolute alcohol and sufficient sodium hydroxide solution was added to obtain a neutral solution or an alkaline suspension, 40 cc. of water was then added and a uniform solution was obtained.

To the above solution was added slowly and with agitation, 20 cc. of 10% aqueous gelatin solution. The mixture was maintained at 40° C. until used for coating, which is effected as promptly as possible.

EXAMPLE 9

1 g. of the dye of Example 2 is suspended in 6 cc. of alcohol and morpholine is cautiously added until the dye goes into solution. At this point the solution should show a pH of 5 to 6 when diluted with water. 50 cc. of water are added and the mixture is stirred until homogeneous.

The above solution is added to 10 cc. of 10% aqueous gelatin solution which has been previously brought to a pH of 7 to 8 by the addition of sodium hydroxide. The mixture is stirred until homogeneous and is then used in the coating of photographic light sensitive elements.

SECTION III

Bleaching and short-stop solutions

EXAMPLE 10

The following solution serves as a combined yellow filter dye bleach and short-stop solution:

Water _____cc__ 500
Hydroxylamine hydrochloride _____grams__ 9
 dissolve—then add
Sodium hydroxide _____do____ 4
Water to make 1000 cc.

Bleach for 2 to 5 minutes at 65–70° F.

EXAMPLE 11

Bleaching solution and short-stop both comprised of the following:

Water _____cc__ 500
Hydroxylamine hydrochloride _____grams__ 35
Sodium acetate (anhydrous) _____do____ 85
Water to make 1000 cc.

Bleach for 2 to 6 minutes at 65–70° F.

EXAMPLE 12

The following solution serves as a combined yellow filter dye bleach and short-stop solution:

Semicarbazide hydrochloride _____grams__ 20
Water _____cc__ 500
6 N sodium hydroxide solution to pH 5
Water to make 1000 cc.

Bleach for 2 to 5 minutes at 65 to 70° F.

EXAMPLE 13

The following solution serves as a combined yellow filter dye bleach and short-stop solution:

Water _____cc__ 500
Hydrazine hydrochloride _____grams__ 10
6 N sodium hydroxide to pH 5
Water to make 1000 cc.

SECTION IV

Preparation of multi-layer film

EXAMPLE 14

A red sensitized silver bromide emulsion containing a phenolic color former fast to diffusion is cast upon a base and over this is cast a green sensitive silver bromide emulsion containing a pyrazolone color former fast to diffusion. Over the green sensitive layer is cast a filter layer prepared according to Example 8. Over the filter layer is cast a blue sensitive emulsion containing an acetoacetanilide color former fast to diffusion.

EXAMPLE 15

The procedure is the same as in Example 14, excepting that the filter layer is prepared according to Example 9.

SECTION V

Film processing

EXAMPLE 16

The film prepared according to Example 14 is exposed, developed in a black and white developer, short-stopped in aqueous sodium bisulfite, washed, re-exposed and developed in a p-diethylaminoaniline developer. The film is bleached, fixed and short-stopped in the bath of Examples 9, 10 or 11. The film is then immersed in a 50% sodium bicarbonate solution, washed and dried.

EXAMPLE 17

The procedure is the same as in Example 16 excepting that the bleach bath of Example 10 is used as a short-stop bath following the color development with the p-diethylaminoaniline developer.

EXAMPLE 18

A photographic material prepared according to Example 17 is exposed and developed in a color developer of the p-diethylaminoaniline type. Following color development, the film is short-stopped in the bath of Example 12, washed, bleached and fixed.

In the accompanying drawing, the two figures are enlarged section views of photographic elements having filter layers and antihalation layers made according to the present invention. As shown therein, Figure 1 illustrates a photographic element comprising a support 1 having on one side thereof, a gelatin antihalation layer 2 containing a hydroxy-substituted Schiff's base and on the other side, a light sensitive silver halide emulsion layer 3.

Figure 2:

Figure 2 illustrates a multilayer photographic element having a support 4, a red sensitive silver halide emulsion 5, a green sensitive silver halide emulsion 6 and a blue sensitive silver halide emulsion 8. Between layers 6 and 8, there is coated a gelatin filter layer 7 containing a hydroxy-substituted Schiff's base.

Modifications of the invention will occur to persons skilled in the art. Thus it is evident that any of the aldehydes mentioned above may be combined with any of the amines, to form satisfactory yellow colorants for filter or antihalation layers. Similarly, while the examples are directed to the use of the colorants in forming filters for color photography, it is understood that the colorants may also be used to form filters and antihalation layers for black and white photography.

I, therefore, do not intend to be limited in the patent granted, except as required by the appended claims.

I claim:

1. In the processing of multi-layer photographic color material containing three light sensitive silver halide emulsion layers sensitized respectively to the red, green and blue regions of the spectrum and containing as a yellow filter layer a water soluble colloid having dispersed therein a dyestuff selected from the class consisting of those of the following formulae:

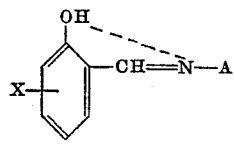

and

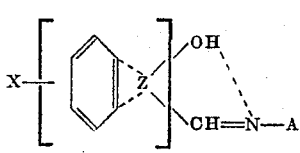

wherein the hydroxyl group is always ortho to the azo methine linkage, and in which X is a member selected from the class consisting of hydrogen, alkyl, hydroxyalkyl, aryl, amino, acylamino, acyloxyalkyl, hydroxy, nitro, sulfo, carboxy and cyano, Z represents the atoms necessary to complete a 6-membered ring selected from the class consisting of aromatic and heterocyclic rings containing a conjugated unsaturated system and A is selected from the class consisting of aliphatic and aromatic radicals involving the exposure of such material and the color development of the same, the improvement which comprises discharging said yellow filter dye by subjecting the material to the action of an aqueous bath containing a substance selected from the class consisting of hydroxylamine, hydrazine and a semi-carbazide and the salts thereof.

2. A light sensitive photographic element comprising a base and light sensitive silver halide emulsion layer and including as a filter, a water soluble colloid having dispersed therein an irreversibly dischargeable Schiff's base selected from the class consisting of those of the following formula:

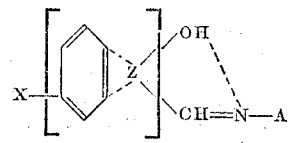

wherein the hydroxyl group is always ortho to the azomethine linkage, and in which X is a member selected from the class consisting of hydrogen, alkyl, hydroxyalkyl, aryl, amino, acylamino, acyloxyalkyl, hydroxy, nitro, sulfo, carboxy and cyano, Z represents the atoms necessary to complete a 6-membered ring selected from the class consisting of aromatic and heterocyclic rings containing a conjugated unsaturated system, and A is selected from the class consisting of aliphatic and aromatic radicals, said Schiff's base containing a group which renders it non-migratory in said water soluble colloid.

3. The light sensitive photographic element defined in claim 2, wherein the filter dye has the following formula:

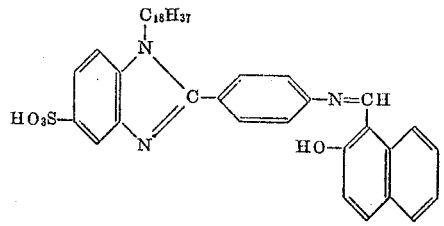

4. A light sensitive element as defined in claim 2 wherein said group which renders the Schiff's base non-migratory in the water soluble colloid is an alkyl chain of at least ten carbon atoms.

5. In a multi-layer photographic material containing three light sensitive silver halide emulsion layers sensitized respectively for the red, green and blue regions of the spectrum, a yellow filter layer interpolated between the green and blue sensitive emulsion layers, comprising gelatin having dispersed therein, a yellow dyestuff having a group which renders said dyestuff non-migratory in gelatin and selected from the class consisting of those of the following formula:

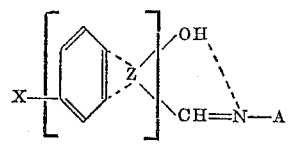

wherein the hydroxyl group is always ortho to the azomethine linkage, and in which X is a member selected from the class consisting of hydrogen, alkyl, hydroxyalkyl, aryl, amino, acylamino, acyloxyalkyl, hydroxy, nitro, sulfo, carboxy and cyano, Z represents the atoms necessary to complete a 6-membered ring selected from the class consisting of aromatic and heterocyclic rings containing a conjugated unsaturated system and A is selected from the class consisting of aliphatic and aromatic radicals.

6. The multilayer photographic material as defined in claim 5 wherein the yellow dyestuff contains a long aliphatic chain which renders the dyestuff non-migratory in the gelatin in which it is dispersed.

7. In the processing of a photographic element comprising a base and a light sensitive silver halide emulsion layer and including as a filter, a water soluble colloid having dispersed therein an irreversibly dischargeable Schiff's base selected from the class consisting of those of the following formulae:

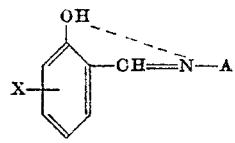

and

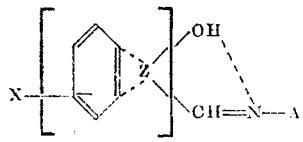

wherein the hydroxyl group is always ortho to the azomethine linkage, and in which X is a member selected from the class consisting of hydrogen, alkyl, hydroxyalkyl, aryl, amino, acylamino, acyloxyalkyl, hydroxy, nitro, sulfo, carboxy and cyano, Z represents the atoms necessary to complete a 6-membered ring selected from the class consisting of aromatic and heterocyclic rings containing a conjugated unsaturated system and A is selected from the class consisting of aliphatic and aromatic radicals, said Schiff's base containing a group which renders it non-migratory in said water soluble colloid, said processing involving the exposure of such material and the development of the same, the improvement which comprises irreversibly discharging said Schiff's base by subjecting the photographic element to the action of an aqueous bath containing a substance selected from the class consisting of hydroxylamine, hydrazine and a semi-carbazide and the salts thereof.

References Cited in the file of this patent

UNITED STATES PATENTS

| Number | Name | Date |
|---|---|---|
| 2,078,398 | Mannes et al. | Apr. 27, 1937 |
| 2,143,786 | Mannes et al. | Jan. 10, 1939 |
| 2,186,849 | Wilmanns et al. | Jan. 9, 1940 |
| 2,388,903 | Cantrell et al. | Nov. 13, 1945 |
| 2,440,070 | Blout et al. | Apr. 20, 1948 |

FOREIGN PATENTS

| Number | Country | Date |
|---|---|---|
| 529,440 | Great Britain | Nov. 21, 1940 |
| 894,181 | France | Mar. 6, 1944 |
| 622,731 | Great Britain | May 6, 1949 |